(12) United States Patent
Chang

(10) Patent No.: US 11,335,287 B2
(45) Date of Patent: May 17, 2022

(54) DISPLAY PANEL, DRIVING METHOD FOR A DISPLAY PANEL, AND DISPLAY DEVICE

(71) Applicant: HKC CORPORATION LIMITED, Shenzhen (CN)

(72) Inventor: Hongyan Chang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 420 days.

(21) Appl. No.: 16/349,279

(22) PCT Filed: Feb. 20, 2019

(86) PCT No.: PCT/CN2019/075511
§ 371 (c)(1),
(2) Date: May 13, 2019

(87) PCT Pub. No.: WO2020/155215
PCT Pub. Date: Aug. 6, 2020

(65) Prior Publication Data
US 2021/0327379 A1 Oct. 21, 2021

(30) Foreign Application Priority Data
Jan. 30, 2019 (CN) .......................... 201910089193.5

(51) Int. Cl.
*G09G 3/36* (2006.01)
*G02F 1/1362* (2006.01)
(52) U.S. Cl.
CPC ......... *G09G 3/3614* (2013.01); *G09G 3/3677* (2013.01); *G02F 1/136286* (2013.01); *G09G 2310/0202* (2013.01); *G09G 2310/0251* (2013.01); *G09G 2320/0233* (2013.01)

(58) Field of Classification Search
CPC combination set(s) only.
See application file for complete search history.

(56) References Cited

U.S. PATENT DOCUMENTS

| 9,299,303 | B2 | 3/2016 | Nagashima et al. | |
|---|---|---|---|---|
| 2006/0279506 | A1* | 12/2006 | Choi | G09G 3/3614 345/98 |
| 2009/0167661 | A1 | 7/2009 | Song et al. | |
| 2010/0110046 | A1 | 5/2010 | Chen et al. | |

(Continued)

FOREIGN PATENT DOCUMENTS

| CN | 1637544 A | 7/2005 |
|---|---|---|
| CN | 1790470 A | 6/2006 |
| CN | 101952875 A | 1/2011 |

(Continued)

OTHER PUBLICATIONS

CN102568398 Jul. 11, 2012 Yuanyi Liao English machine translation (Year: 2012).*

(Continued)

*Primary Examiner* — Van N Chow

(57) ABSTRACT

The present disclosure provides a display panel, a driving method for a display panel, and a display device. The driving method for the display panel includes a first column of pixels and a second column of pixels. When charging the second column of pixels corresponding to a 2nth row of scanning lines, the second column of pixels corresponding to a (2n+4)th row of scanning lines is pre-charged.

20 Claims, 5 Drawing Sheets

(56) References Cited

U.S. PATENT DOCUMENTS

| | | | |
|---|---|---|---|
| 2020/0035140 A1* | 1/2020 | Chen | G09G 3/2003 |
| 2020/0342826 A1* | 10/2020 | Hasegawa | G09G 3/3666 |

FOREIGN PATENT DOCUMENTS

| | | |
|---|---|---|
| CN | 101995698 A | 3/2011 |
| CN | 102568398 A | 7/2012 |
| CN | 102592537 A | 7/2012 |
| CN | 104391411 A | 3/2015 |
| CN | 104680998 A | 6/2015 |
| CN | 108847194 A | 11/2018 |
| CN | 108877725 A | 11/2018 |
| CN | 109215608 A | 1/2019 |

OTHER PUBLICATIONS

CN1019955698 Zhihao Sun Mar. 30, 2011 English machine translation (Year: 2011).*

International Search Report issued in corresponding International application No. PCT/CN2019/075511, dated Sep. 26, 2019 (7 pages).

Written opinion of the International Search Authority in corresponding International application No. PCT/CN2019/075511, dated Sep. 26, 2019.

First Office Action from China patent office in a counterpart Chinese patent Application 201910089193.5, dated Feb. 6, 2020 (10 pages).

* cited by examiner

DISPLAY PANEL, DRIVING METHOD FOR A DISPLAY PANEL, AND DISPLAY DEVICE

The present application claims foreign priority to Chinese Patent Application No. 201910089193.5, titled: DISPLAY PANEL, DRIVING METHOD FOR A DISPLAY PANEL, AND DISPLAY DEVICE, filed on Jan. 30, 2019 in the State Intellectual Property Office of China, and the entire contents of which is hereby incorporated by reference.

TECHNICAL FIELD

The present disclosure relates to a field of display technology, and in particular to a display panel, a driving method for a display panel, and a display device.

BACKGROUND

The statements herein only provides background information related to the present disclosure without necessarily constituting the prior art.

With the development and advancement of technology, flat panel displays have become mainstream products of displays because of their thin bodies, low power consumption and low radiation, and have been widely used. The flat panel displays include thin film transistor-liquid crystal display (TFT-LCD), organic light-emitting diode (OLED) displays, and etc. The TFT-LCD controls a rotation direction of liquid crystal (LC) molecules to refract the light of a backlight module to generate images, and has many advantages such as having a thin body, power saving, and no radiation. The OLED is made of organic electroluminescent diode, and has many advantages such as self-illumination, short response time, high definition and contrast, flexible display, and large-area full-color display.

The TFT-LCD technology includes a dual-gate design. When combined with a scanning line and two data lines, the display panel generates vertical bright lines and vertical dark lines.

SUMMARY

The technical problem to be solved by the present disclosure is to provide a display panel, a driving method for a display panel, and a display device to solve an appearance of vertical bright lines and vertical dark lines.

To achieve the above object, the present disclosure provides a display panel, includes a substrate, a plurality of data lines disposed on the substrate, a plurality of scanning lines disposed on the substrate, a plurality of pixels respectively including sub-pixels disposed along a direction of the scanning lines with different colors, and a gate driving chip outputting a gate start signal to the scanning lines to open the pixels.

Each row of the pixels includes a plurality of pixel groups. Each pixel group includes a first column of pixels and a second column of pixels adjacent to the first column of pixels. The first column of pixels is before the second column of pixels. The first column of pixels and the second column of pixels are connected with a same data line. And the first column of pixels and the second column of pixels are correspondingly connected with a (2n−1)th row of scanning lines and a 2nth row of scanning lines respectively.

A polarity of a data drive signal of the first column of pixels inverse to a polarity of a data drive signal of the second column of pixels in a same pixel group. The polarity of the data drive signal of the first column of pixels corresponding to a (2n+1)th row of scanning lines is a same as the polarity of the data drive signal of the second column of pixels corresponding to the 2nth row of scanning lines.

The second column of pixels corresponding to the 2nth row of scanning lines is charged when the 2nth row of scanning lines is turned on. And within an opening time period of the 2nth row of scanning lines, a (2n+4)th row of scanning lines is turned on, and the second column of pixels corresponding to the (2n+4)th row of scanning lines is pre-charged. The number n is a nature number no less than 1.

The present disclosure further provides a driving method for a display panel, including steps of:

charging a first column of pixels corresponding to a (2n−1)th row of scanning lines and a mth column of data lines with a data drive signal of a first polarity, when a (2n−1)th row of scanning lines receives a gate start signal; and charging a second column of pixels corresponding to a 2nth row of scanning lines and the mth column of data lines with a data drive signal of a second polarity, when a 2nth row of scanning lines receives a gate start signal, and turning on a (2n+4)th row of scanning lines to pre-charge the second column of pixels corresponding to the (2n+4)th row of scanning lines. Wherein m and n are natural numbers no less than 1.

Optionally, the step for charging a first column of pixels corresponding to a (2n−1)th row of scanning lines and a mth column of data lines with a data drive signal of a first polarity, when a (2n−1)th row of scanning lines receives a gate start signal further includes:

turning on a (2n+3)th row of scanning lines and pre-charging the first column of pixels corresponding to the (2n+3)th row of scanning lines within an opening time period of a first row of scanning lines corresponding to the (2n−1)th row of scanning lines. A pre-charge time of the first column of pixels is no more than a pre-charge time of the second column of pixels.

Optionally, a pre-charge time for pre-charging the second column of pixels of each row is less than an opening time of one row of scanning lines.

Optionally, a pre-charge time for pre-charging the second column of pixels of each row is equal to an opening time of one row of scanning lines.

Optionally, when the second column of pixels of each row is pre-charged respectively, the first column of pixels of each row is pre-charged in a same time period.

Optionally, when the second column of pixels of each row is pre-charged respectively, the first column of pixels of each row is pre-charged. A pre-charge time for pre-charging the second column of pixels of each row is more than a pre-charge time for pre-charging the first column of pixels of each row.

Optionally, when the second column of pixels of each row is pre-charged respectively, the first column of pixels of each row is not pre-charged.

Optionally, a ratio of the pre-charge time to the opening time of one row of scanning lines is equal to a predetermined ratio value.

The present disclosure further provides a display device. The display device includes the display panel described above.

In the present disclosure, the second column of pixels (pixels of each dark column) corresponding to the 2nth row of scanning lines is charged when the 2nth row of scanning lines is turned on. And within the opening time period of the 2nth row of scanning lines, the (2n+4)th row of scanning lines is turned on, and the second column of pixels corresponding to the (2n+4)th row of scanning lines is precharged, The charging voltage of the pixels of the dark column is increased, which improve a charging voltage of the pixels of the dark column, reduce a difference between a final charging voltage of pixels of bright columns and a final charging voltage of pixels of dark columns, and even eliminate the difference. Further, charge amounts of the first column of pixels and charge amounts of the second column of pixels are equivalent eventually, so that a luminance difference between the first column of pixels and the second column of pixels is reduced, and the appearance of vertical bright lines and vertical dark lines is improved.

BRIEF DESCRIPTION OF DRAWINGS

The drawings are included to provide a further understanding of embodiments of the present disclosure, which form portions of the specification and are used to illustrate implementation manners of the present disclosure and are intended to illustrate operating principles of the present disclosure together with the description. Apparently, the drawings in the following description are merely some of the embodiments of the present disclosure, and those skilled in the art are able to obtain other drawings according to the drawings without contributing any inventive labor. In the drawing.

DETAILED DESCRIPTION

Figure 1:
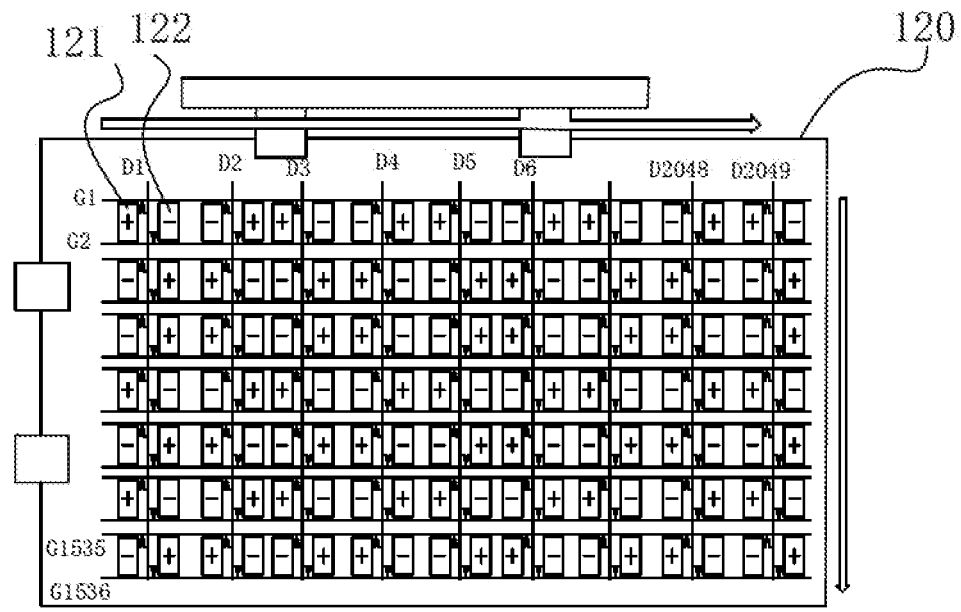
FIG. 1 is a first schematic diagram of a pixel driving architecture of a display panel according to an embodiment of the present disclosure.

Specific structure and function details disclosed herein are only representative and are used for the purpose of describing exemplary embodiments of the present disclosure. However, the present disclosure may be achieved in many alternative forms and shall not be interpreted to be only limited to the embodiments described herein.

It should be understood in the description of the present disclosure that terms such as "central", "horizontal", "upper". "lower", "left", "right", "vertical", "horizontal". "top", "bottom", "inner". "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, the terms such as "first" and "second" are only used for the purpose of description, rather than being understood to indicate or imply relative importance or hint the number of indicated technical features. Thus, the feature limited by "first" and "second" can explicitly or impliedly include one or more features. In the description of the present disclosure, the meaning of "a plurality of" is two or more unless otherwise specified. In addition, the term "include" and any variant are intended to cover non-exclusive inclusion.

It should be noted in the description of the present disclosure that, unless otherwise regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the present disclosure may be understood according to concrete conditions.

The terms used herein are intended to merely describe concrete embodiments, not to limit the exemplary embodiments. Unless otherwise noted clearly in the context, singular forms "one" and "single" used herein are also intended to include plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

There are three designs for thin film transistor-liquid crystal display (TFT-LCD) technology: a normal design, a dual-gate design, and a tri-gate design. Taking a resolution of a HD (1366×768) as an example, the normal design has 4098 data lines and 768 scanning lines, and the dual-gate design has 2049 data lines and 1536 scanning lines. Compared with the conventional design, the data line of the dual-gate design is reduced by a half and the scanning line thereof is doubled. The tri-gate design has 1366 data lines and 2304 scanning lines. Compared to the conventional design, the data lines of the tri-gate design is reduced by ⅓, and the scanning line of the tri-gate design is tripled The dual-gate design has two driven modes: driven by a scanning line and two data lines, or driven by a data line and two scanning lines. Dual-gate design with any of these two driven modes, in certain circumstances of a resistor capacitor (RC) design, Because of a limitation of a process capability of a factory, the RC may be enlarged in an actual process, resulting in insufficient charging rate, and an easy appearance of vertical bright lines and vertical dark lines in a low gray scale screen.

Figure 2:
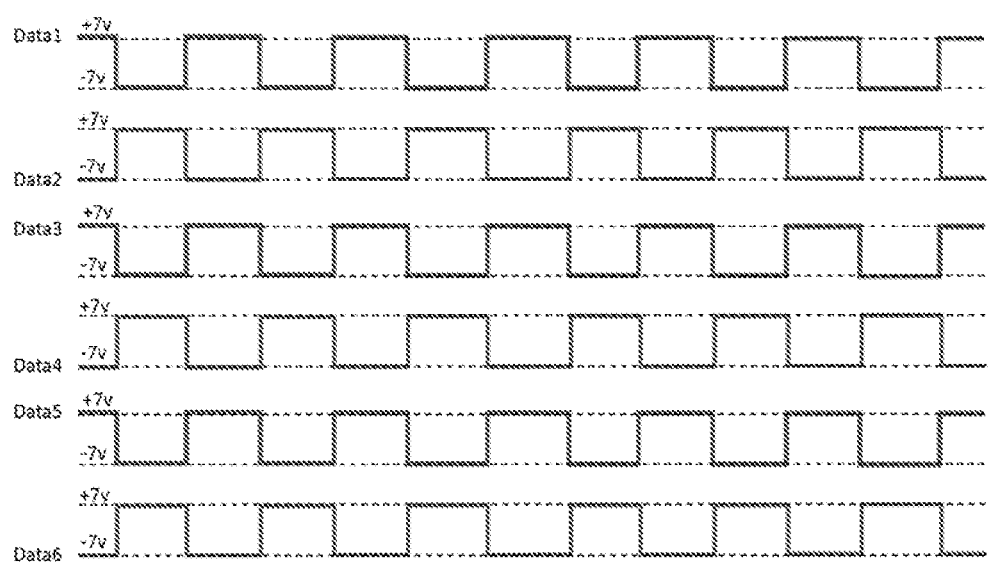
FIG. 2 is a schematic diagram of a digital signal waveform diagram corresponding to a pixel driving architecture of a display panel according to an embodiment of the present disclosure.
Figure 3:
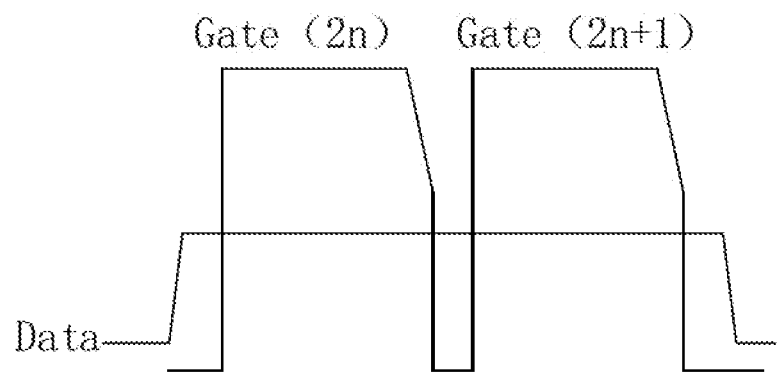
FIG. 3 is a schematic diagram of one data line and two scanning lines of a display panel according to an embodiment of the present disclosure.

As shown in FIG. 1 and FIG. 2, taking a driving architecture shown in FIG. 1 as an example, D1, D2, D3, D4, D5, and D6 are all data lines, and G1 and G2 are scanning lines. A scanning direction is as shown in the figure. As shown in FIG. 3, one data line corresponds to two rows of scanning lines, and one data line controls pixels of a left column and pixels of a right column. Taking the data line D1 as an example, when a voltage of the first row of scanning lines of G1 is turned on, a data drive signal transmits to the data line D1 and the data line D1 provides a positive polarity pixel signal to the pixels of the left column firstly. After an opening time of one scanning line, the next row of scanning lines G2 is turned on, and the data line D1 provides a negative polarity pixel signal to the pixels of the right column. As shown in FIG. 2, a voltage across from positive polarity to negative polarity is 14V. And then after the opening time of one scanning line, the third row of caning lines is turned on, the data line D1 provides a positive polarity pixel signal to the pixels of the left column firstly, while the voltage across from negative polarity to negative polarity is 0V. As shown in FIG. 2, the voltage across between the pixels of the left column of the data line to the pixels of the right column of the data line is largest. In a case of insufficient charging rate, it is easy to generate bright lines and dark lines, that is, pixels with large voltage across are dark, and pixels without the voltage across are bright. Thus, the pixel of the left column of the data line is bright, and the pixel of the right column is dark, and bright lines and dark lines are generated.

The present disclosure is further described below with reference to the accompanying drawings and optional embodiments.

Figure 4:
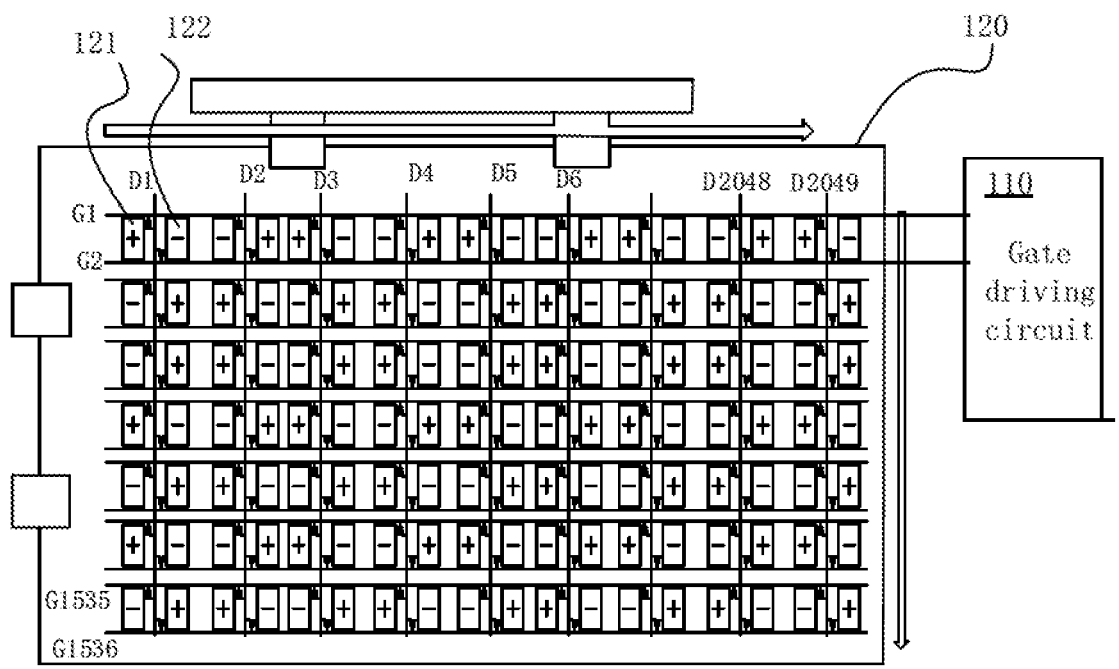
FIG. 4 is a second schematic diagram of a pixel driving architecture of a display panel according to an embodiment of the present disclosure.

As shown in FIG. 4, the present disclosure provides a display panel, includes a substrate 120, a plurality of data lines disposed on the substrate 120, a plurality of scanning lines disposed on the substrate 120, a plurality of pixels respectively including sub-pixels disposed along a direction of the scanning lines with different colors, and a gate driving chip 110 outputting a gate start signal to the scanning lines to open the pixels.

Each row of the pixels includes a plurality of pixel groups. Each pixel group includes a first column of pixels 121 and a second column of pixels 122 adjacent to the first column of pixels 121. The first column of pixels 121 is before the second column of pixels 122. The first column of pixels 121 and the second column of pixels 122 are connected with a same data line. And the first column of pixels 121 and the second column of pixels 122 are correspondingly connected with a (2n−1)th row of scanning lines and a 2nth row of scanning lines respectively.

A polarity of a data drive signal of the first column of pixels 121 inverse to a polarity of a data drive signal of the second column of pixels 122 in a same pixel group. The polarity of the data drive signal of the first column of pixels 122 corresponding to a (2n+1)th row of scanning lines is a same as the polarity of the data drive signal of the second column of pixels 122 corresponding to the 2nth row of scanning lines.

The second column of pixels 122 corresponding to the 2nth row of scanning lines is charged when the 2nth row of scanning lines is turned on. And within an opening time period of the 2nth row of scanning lines, a (2n+4)th row of scanning lines is turned on, and the second column of pixels 122 corresponding to the (2n+4)th row of scanning lines is pre-charged. The number n is a nature number no less than 1.

A value of the n is no more than a sum of rows of the scanning line.

Taking a current pixel group and a next pixel group connected to the same data line as the current pixel group as an example, because the first column of pixels 121 of each pixel group shares one data line with the second column of pixels 122 of each pixel group, and the data line connected with the first column of pixels 121 is different from the data line connected with the second column of pixels 122, when the gate driving chip 110 outputs the gate start signal to the scanning lines to open the pixels of each column, the first column of pixels is turned on and charged firstly. When the first row of scanning lines is turned off, the next row of scanning lines is turned on, and the second column of pixels is turned on and charged. Because the polarity of the data drive signal of the first column of pixels 121 of the current pixel group is inverse to the polarity of the data drive signal of the second column of pixels 122 of the current pixel group, and the first column of pixels 121 and the second column of pixels 122 are connected to the same data line, the polarity of the second column of pixels 122 of the current pixel group is the same as the polarity of the first column of pixels 121 of the next pixel group, result in that the polarity does not reverse when the polarity of the second column of pixels 122 of the current pixel group switches to the polarity of the first column of pixels 121 of the next pixel group. When the scanning time of the first column of pixels 121 ends and the scanning time of the second column of pixels 122 starts, a polarity of a data voltage in the same data line is converted, which takes a certain time for the voltage value of the data line to reach a predetermined voltage value. At a beginning of the scanning time, a charging efficiency of the second column of pixels 122 is low such that a final charging voltage of the second column of pixels 122 is lower than the final charging voltage of the first column of pixels 121, thus, the first column of pixels 121 favors bright, and the second column of pixels 122 favors dark, and an appearance of vertical bright lines and vertical dark lines is generated.

In the present embodiment, the second column of pixels 122 (pixels of each dark column) corresponding to the 2nth row of scanning lines is charged when the 2nth row of scanning lines is turned on, and within the opening time period of the 2nth row of scanning lines, the (2n+4)th row of scanning lines is turned on, and the second column of pixels 122 corresponding to the (2n+4)th row of scanning lines is pre-charged, The charging voltage of the pixels of the dark column is increased, which improve the charging voltage of the pixels of the dark column, reduce a difference between a final charging voltage of pixels of bright columns and a final charging voltage of pixels of dark columns, and even eliminate the difference. Further, charge amounts of the first column of pixels 121 and charge amounts of the second column of pixels 122 are equivalent eventually, so that a luminance difference between the first column of pixels 121 and the second column of pixels 122 is reduced, and problem of the appearance of vertical bright lines and vertical dark lines is improved.

The dark column must be pre-charged, and a pre-charge time is no more than an opening time of one row of scanning lines. The bright column can be pre-charged or not pre-charged, including but not limited to the following situations:

The following driving method corresponds to the above-described driving architecture of the display panel.

Figure 5:
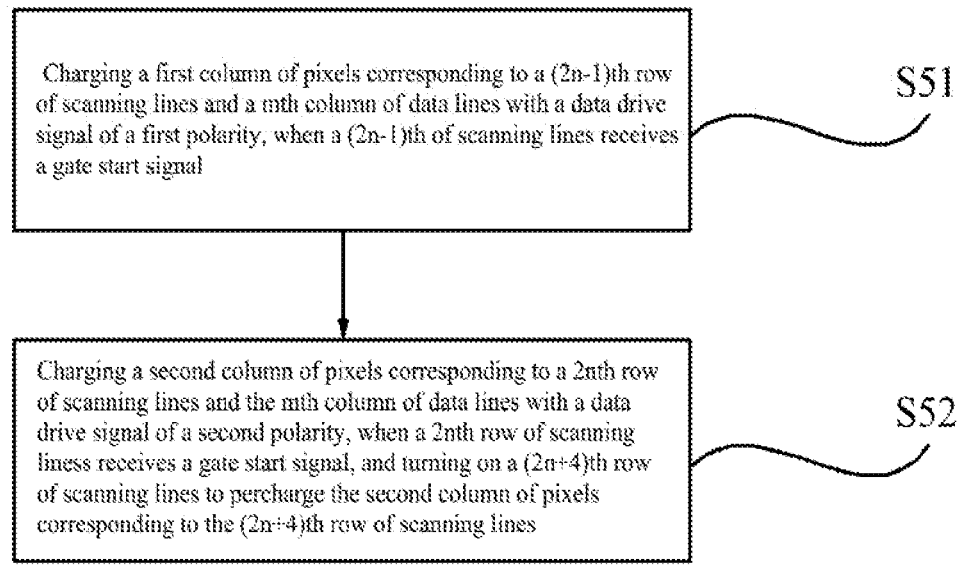
FIG. 5 is a first schematic diagram of a flowchart of a display panel driving method according to an embodiment of the present disclosure.

As shown in FIG. 5, the present disclosure further provides a driving method for a display panel 101, including steps of:

S51: charging a first column of pixels corresponding to a (2n−1)th row of scanning lines and a mth column of data lines with a data drive signal of a first polarity, when a (2n−1)th of scanning lines receives a gate start signal; and S52: charging a second column of pixels corresponding to a 2nth row of scanning lines and the mth column of data lines with a data drive signal of a second polarity, when a 2nth row of scanning lines receives a gate start signal, and turning on a (2n+4)th row of scanning lines to per-charge the second column of pixels corresponding to the (2n+4)th row of scanning lines.

The numbers m and n are natural members no less than 1.

The mth column of data lines corresponding to the (2n−1)th row of scanning lines is same as the mth column of data lines corresponding to the 2nth row of scanning lines.

In this solution, before the second column of pixels 122 is not pre-charged; when the (2n−1)th row of scanning lines receives the gate start signal, the first column of pixels 121 corresponding to the (2n−1)th row of scanning lines is charged with the data drive signal of the first polarity. A luminance of the first column of pixels 121 is relatively bright, and the first column of pixels 121 is in a state close to a predetermined charging voltage or has reached a predetermined charging voltage. The polarity of the first column of pixels 121 corresponding to the previous row of scanning lines is inverse to the polarity of the second column of pixels 122, which makes an occurrence of the voltage across appearance, and makes the initial charging efficiency of the scanning lines being insufficient, result in that the second column of pixels 122 is dark, and the vertical bight lines and the vertical dark lines are generated.

An upper limit of a value of n matches a sum of rows of the scanning lines. An upper limit of a value of m matches a sum of columns of the data lines.

Figure 6:
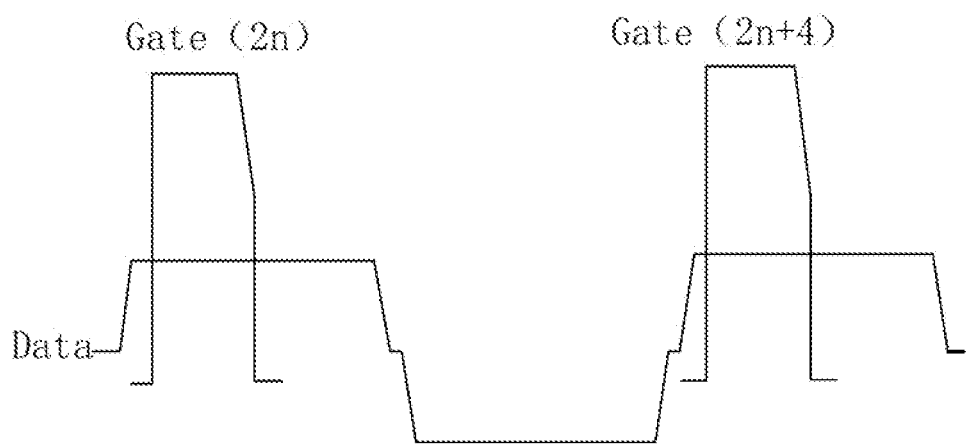
FIG. 6 is a schematic diagram of a waveform diagrams corresponding to a display panel driving method according to an embodiment of the present disclosure, where only a second column of pixels in pre-charged.

According to a waveform diagram shown in FIG. 6, the pixels of the dark column are pre-charged only. When the 2nth row of scanning lines receives the gate start signal, the second column of pixels 122 corresponding to the 2nth row of scanning lines and the 2nth data line is charged with the data drive signal of the second polarity, and the (2n+1)th row of scanning lines is turned on and the second column of pixels 122 corresponding to the (2n+1)th row of scanning lines is pre-charged. Even if there is a polarity voltage across conversion between the data voltage of the first column of pixels 121 and the data voltage of the second column of pixels 122 connected to the same data line as the first column of pixels 121, the pre-charge increases the pre-charge time of the pixels, avoids an effect of the voltage across. Moreover, after pre-charging, the charge time of the second column of pixels 122 is greatly improved, so that the final charging voltage of the second column of pixels 122 is increased, the second column of pixels 122 is brightened, and even reach a predetermined charging voltage. Thus, the final charging voltage of the first column of pixels 121 and the second column of pixels 122 are close to or reach a predetermined charging voltage. The charge amounts of the first column of pixels 121 and the charge amounts of the second column of pixels 122 are equivalent eventually, so that the luminance difference between the first column of pixels 121 and the second column of pixels 122 is reduced, and the appearance of vertical bright lines and vertical dark lines is improved.

Figure 7:
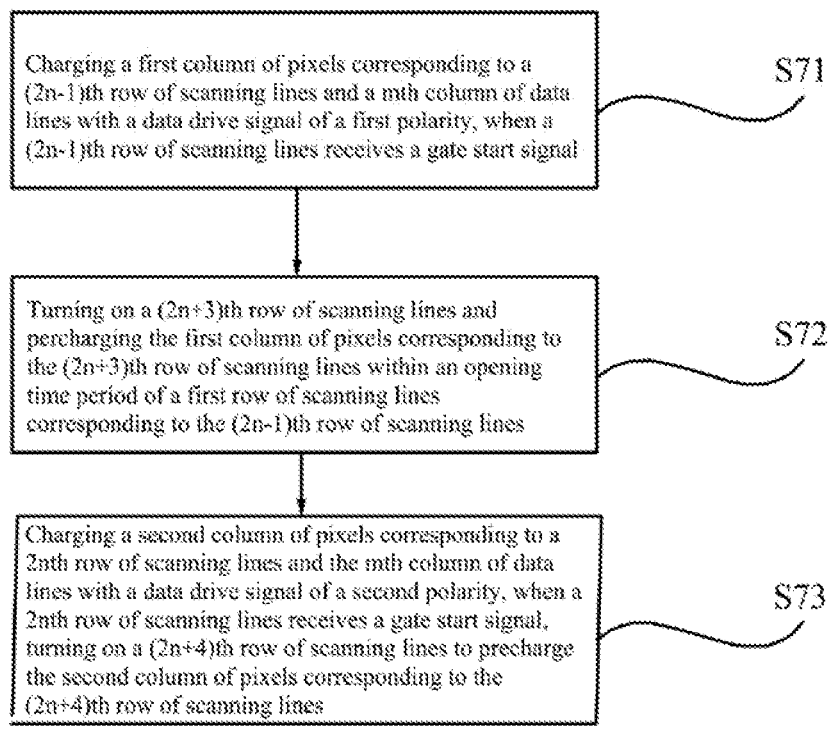
FIG. 7 is a second schematic diagram of a flowchart of a display panel driving method according to an embodiment of the present disclosure.

As shown in FIG. 7, the present disclosure further provides a driving method for a display panel 101, including steps of:

S71: charging a first column of pixels corresponding to a (2n−1)th row of scanning lines and a mth column of data lines with a data drive signal of a first polarity, when a (2n−1)th row of scanning lines receives a gate start signal;

S72: turning on a (2n+3)th row of scanning lines and per-charging the first column of pixels corresponding to the (2n+3)th row of scanning lines within an opening time period of a first row of scanning lines corresponding to the (2n−1)th row of scanning lines; and S73: charging a second column of pixels corresponding to a 2nth row of scanning lines and the mth column of data lines with a data drive signal of a second polarity, when a 2nth row of scanning lines receives a gate start signal, turning on a (2n+4)th row of scanning lines to pre-charge the second column of pixels corresponding to the (2n+4)th row of scanning lines.

The numbers m and n are natural numbers no less than 1.

Figure 8:
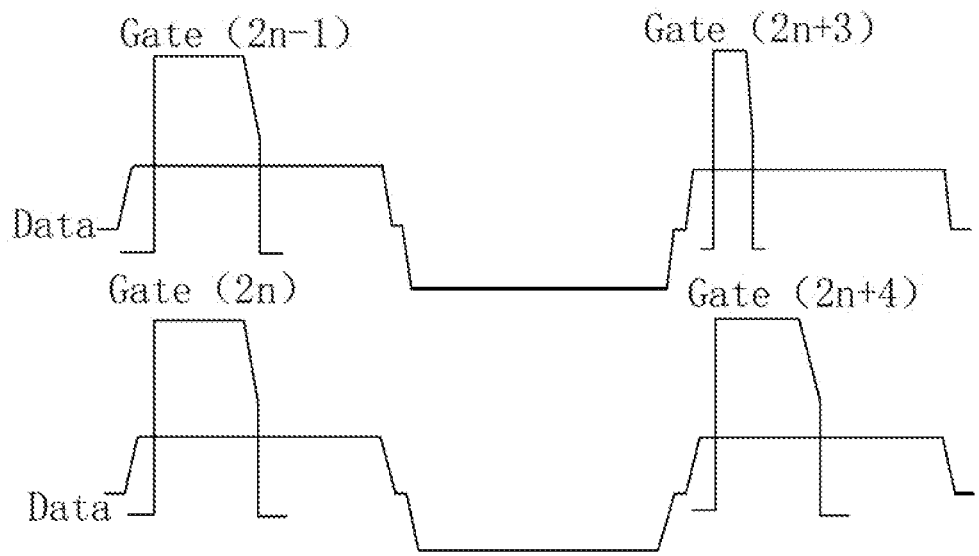
FIG. 8 is a schematic diagram of a waveform diagrams corresponding to a display panel driving method according to an embodiment of the present disclosure, where a precharge time of a first column of pixels is less than a pre-charge time of a second column of pixels.

As shown in FIG. 8, a pre-charge time of the first column of pixels is no more than a pre-charge time of the second column of pixels.

In the embodiment, when the gate driving chip 110 outputs a gate start signal to the 2nth row of scanning lines, the second column of pixels 122 corresponding to each data line on the 2nth row of scanning lines is turned on and charged. At the same time, within an opening time period of the nth row of scanning lines, the (2n+4)th row of scanning lines is turned on, and the corresponding second column of pixels 122 is pre-charged. Thus, the polarity of the data drive signal corresponding to the second column of pixels 122 corresponding to the 2nth row of scanning lines is same as the polarity of the data drive signal corresponding to the second column of pixels 122 of the (2n+4)th row of the scanning line. Even if the polarity voltage across conversion occurs between the data voltage of the first column of pixels 121 and the data voltage of the second column of pixels 122 connected to the same data line as the first column of pixels 121, the sufficient pre-charge time avoids the effect of the voltage across. Moreover, after pre-charging, the charge time of the second column of pixels 122 is greatly improved, so that the final charging voltage of the second column of pixels 122 is increased, the second column of pixels 122 is brightened, and the second column of pixels 122 even reaches a predetermined charging voltage.

When the gate driving chip 110 outputs a gate start signal to the (2n−1)th row of scanning lines, the first column of pixels 121 corresponding to each data line on the (2n−1)th row of scanning lines is turned on. And within the opening time period of the first row of scanning lines corresponding to the (2n−1)th row of scanning lines, turn on the (2n+3)th row of scanning lines, and the corresponding first column of pixels 121 is pre-charged. In the embodiment, the first column of pixels 121 is pre-charged such that the first column of pixels 121 reaches the predetermined charging voltage. Thus, the final charging voltage of the first column of pixels 121 and the final charging voltage of second column of pixels 122 are close to or reach a predetermined charging voltage, and the charge amounts of the first column of pixels 121 and the charge amounts of the second column of pixels 122 are equivalent eventually. Thus, the luminance difference between the first column of pixels 121 and the second column of pixels 122 is reduced, the appearance of vertical bright lines and vertical dark lines is improved, and the display luminance of the overall panel is improved.

For example, the pre-charge voltage of the first column of pixels 121 and the pre-charge voltage of the second column of pixels 122 are both 10V. In a case where pre-charge is not executed, the charging voltage of the first column of pixels 121 is 8V and the charging voltage of the second column of pixels 122 is 7V. After pre-charging the first column of pixels 121 and the second column of pixels 122, the final charging voltage of the first column of pixels 121 reaches 10V, and the final charging voltage of the second pixel reaches 10V also, which solves the problem of the appearance of vertical bright lines and vertical dark lines, and an overall luminance of the display panel is increased from (7+8)/2=7.5 to 10V. Further, the luminance is obviously improved, which improves display quality of the display panel 101.

In an embodiment, a pre-charge time for pre-charging the second column of pixels 122 of each row is less than an opening time of one row of scanning lines.

In the embodiment, the second column of pixels 122 of each row is pre-charged, and the pre-charge time for pre-charging the second column of pixels 122 is less than the opening time of one row of scanning lines. Moreover, after pre-charging, the charge time of the second column of pixels 122 is improved, which not only counteracts the problem caused by the voltage across, but also increases the final charging voltage of the second column of pixels 122. To pre-charge the first column of pixels 121 to perform luminance compensation on the originally undercharged pixels, so that the charge amounts of the first column of pixels 121 and the charge amounts of the second column of pixels 122 are equivalent eventually, which reduces the luminance difference, and improves the problem of the appearance of vertical bright lines and vertical dark lines.

In an embodiment, a pre-charge time for pre-charging the second column of pixels 122 of each row is equal to an opening time of one row of scanning lines.

In the embodiment, the second column of pixels 122 of each row is pre-charged, and the pre-charge time for pre-charging the second column of pixels 122 is equal to the opening time of one row of scanning lines. The charge time of the second column of pixels 122 is improved, and the problem caused by the voltage across is counteracted. Moreover, after counteracting the effects of the voltage across, there is sufficient time to pre-charge the corresponding second column of pixels 122. Thus, the final charging voltage of the second column of pixels 122 is increased. To pre-charge the first column of pixels 121 to perform luminance compensation on the originally undercharged pixels, so that the charge amounts of the first column of pixels 121 and the charge amounts of the second column of pixels 122 are equivalent eventually, which reduces the luminance difference, improves the problem of the appearance of vertical bright lines and vertical dark lines, and improves the overall luminance of the display panel 101.

Figures 9, 10:
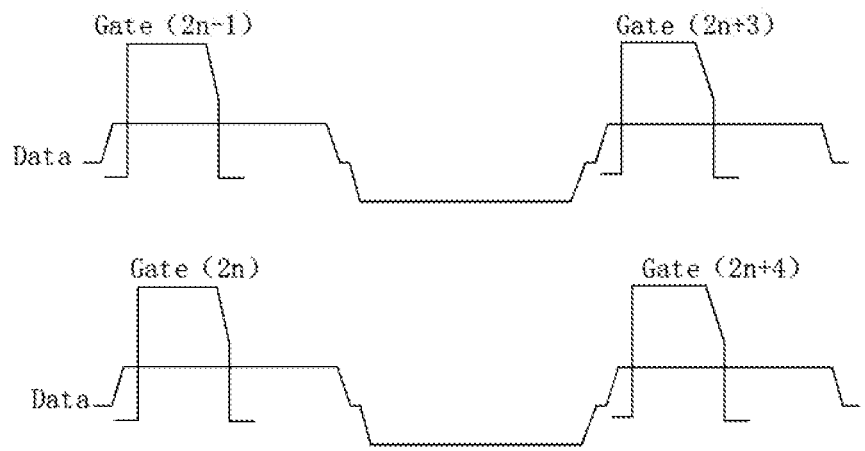
FIG. 9 is a schematic diagram of a waveform diagrams corresponding to a display panel driving method according to an embodiment of the present disclosure, where both of a first column of pixels and a second column of pixels are pre-charged.
FIG. 10 is a schematic diagram of a display device according to an embodiment of the present disclosure.

In one or more embodiments, as shown in FIG. 9, when the second column of pixels 122 of each row is pre-charged respectively, the first column of pixels 121 of each row is pre-charged in a same time period.

In one or more embodiments, the second column of pixels 122 of each row is pre-charged respectively, and the pre-charge time for pre-charging the second column of pixels 122 is equal to the opening time of one row of scanning lines. Both of the first column of pixels 121 and the second column of pixels 122 are p-recharged. The first column of pixels 121 corresponds to a bright column, and the second column of pixels 122 corresponds to a dark column. Even if the polarity voltage across conversion occurs between the data voltage of the first column of pixels 121 and the data voltage of the second column of pixels 122 connected to the same data line as the first column of pixels 121, the sufficient pre-charge time avoids the effect of the voltage across. Moreover, the charge time of the second column of pixels 122 is greatly improved, so that the final charging voltage of the second column of pixels 122 is increased, the second column of pixels 122 is brightened, and the second column of pixels 122 even reaches a predetermined charging voltage.

Meanwhile, the corresponding first column of pixels 121 is pre-charged. Because the luminance of the first column of pixels 121 is bright, most of pixels are in a state close to the predetermined charging voltage or reach the predetermined charging voltage. However, some pixels are undercharged. To pre-charge the first column of pixels 121 such that the first column of pixels 121 reaches the predetermined charging voltage. Thus, the final charging voltage of the first column of pixels 121 and the final charging voltage of second column of pixels 122 are close to or reach the predetermined charging voltage, the charge amounts of the first column of pixels 121 and the charge amounts of the second column of pixels 122 are equivalent eventually. Thus, the luminance difference between the first column of pixels 121 and the second column of pixels 122 is reduced, the problem of the appearance of vertical bright lines and vertical dark lines is improved, and the display luminance of the overall panel is improved.

In one or more embodiments, when the second column of pixels 122 of each row is pre-charged respectively, the first column of pixels 121 of each row is pre-charged. A pre-charge time for pre-charging the second column of pixels 122 of each row is more than a pre-charge time for pre-charging the first column of pixels 121 of each row.

In one or more embodiments, when the second column of pixels 122 of each row is pre-charged respectively, the first column of pixels 121 of each row is pre-charged. The pre-charge time for the second column of pixels 122 of each row is more than the pre-charge time for the first column of pixels 121 of each row. Thus, both of the charge time of the first column of pixels 121 and the charge time of the second column of pixels 122 are improved, and the problem caused by the voltage across is counteracted. Moreover, after counteracting the effects of the voltage across, there is sufficient time to pre-charge the corresponding second column of pixels 122. Thus, the final charging voltage of the first column of pixels 121 and the final charging voltage of the second column of pixels 122 are increased, and the overall luminance of the display panel 101 is improved. The pre-charge time of the first column of pixels 12 is less than the pre-charge time of the second column of pixels 122. This is because for large-sized panels, because a number of rows of scanning line are too large, even the pixels corresponding to the bright columns are undercharged sometimes. The bright columns are farther from the charging voltage corresponding to the data drive signal, and the dark columns are closer to the charging voltage corresponding to the data drive signal. The bright columns and the dark columns adopt different pre-charge times, so the pre-charge is performed to avoid that the final luminance of the bright columns and the dark columns do not reach the charging voltage corresponding to the data drive signal, and luminance difference between the bright column and the dark columns is reduced. Further, luminance of the bright columns and luminance of the dark columns are equal, which better improve the appearance of vertical bright lines and vertical dark lines.

In one or more embodiments, when the second column of pixels 122 of each row is pre-charged respectively, the first column of pixels 121 of each row is not pre-charged.

In one or more embodiments, in many cases, the charging voltage of the first column of pixels 121 is close to or reaches the predetermined charging voltage. At this time, the second column of pixels 122 of each row is pre-charged only. Because the second column of pixels 122 corresponds to the dark column and is pre-charged, the effects of voltage across is avoided, and the charging time is also increased, further, the final charging voltage of the second column of pixels 122 is increased, the second column of pixels 122 is brightened, and the second column of pixels 122 close to or reaches the predetermined charging voltage finally. In this way, the final charging voltages of the first column of pixels and the second column of pixels are close, so that the luminance difference between the first column of pixels 121 and the second column of pixels 122 is reduced, and the appearance of vertical bright lines and vertical dark lines is improved. Moreover, because a pre-charge circuit is not provided for the first column of pixels 121, a number of traces are small, the appearance of vertical bright lines and vertical dark lines is avoided, the overall luminance of the display panel 101 is improved, and the corresponding trace of a pre-charge circuit is reduced. A reduced penetration by the increase of the trace correspond to the pre-charge circuit is reduced.

In one or more embodiments, a ratio of the pre-charge time to the opening time of one row of scanning lines is equal to a predetermined ratio value.

The pre-charge time is a half, two-thirds, one-third, one-quarter, three-quarters, etc. of the opening time of one scanning line.

In one or more embodiments, the ratio of the pre-charge time to the opening time of one row of scanning lines is equal to the predetermined ratio value. The luminance difference between the bright columns and the dark columns varies depending on the display panel 101. The pre-charging time of different predetermined ratio values is set to ensure that the final charging voltage of the first column 121 is rough equal to the final charging voltage of the second column of pixels 122, which not only improves the overall luminance of the display panel 101, but also improves the problem of the appearance of the vertical bright lines and the vertical dark lines.

As another embodiment of the present disclosure, as shown in FIG. 10, the present disclosure further provides a display device 100. The display device includes the display panel 101 described above.

It should be noted that the limitation of each step involved in the present disclosure is not determined to limit the sequence of steps without affecting the implementation of the specific solution. Steps written in the foregoing can be executed first, or later, or even simultaneously as long as the specific solutions can be implemented, which should be considered as the scope of the present disclosure.

The display panel of the present disclosure is selected from a twisted-nematic (TN) type display panel, in-plane Switching (IPS) type display panel, and a vertical-alignment (VA) type display panel. Of course, the display panel can be other types of display panels which are able to be applied.

The above content is a further detailed description of the present disclosure in conjunction with the specific optional embodiments, and the specific implementation of the present disclosure is not limited to the description. It will be apparent to those skilled in the art that a number of simple deductions or substitutions may be made without departing from the conception of the present disclosure, which should be considered as being within the scope of the present disclosure.

What is claimed is:

1. A display panel, comprising:
    a substrate;
    a plurality of data lines disposed on the substrate;
    a plurality of scanning lines disposed on the substrate;
    a plurality of pixels, comprising sub-pixels disposed along a direction of the scanning lines with different colors; and
    a gate driving chip configured to output a gate start signal to the scanning lines to turn on the pixels;
    wherein each row of the pixels comprises a plurality of pixel groups; each pixel group comprises a first-column pixel and a second-column pixel adjacent to the first-column pixel; the first-column pixel is disposed before the second-column pixel; the first-column pixel and the second-column pixel are connected with a same data line; and the first-column pixel and the second-column pixel are correspondingly connected with a (2n−1)th row of scanning line and a 2nth row of scanning line respectively;
    a polarity of a data drive signal of the first-column pixel is inverse to a polarity of a data drive signal of the second-column pixel in a same pixel group; the polarity of the data drive signal of the first-column pixel corresponding to a (2n+1)th row of scanning line is a same as the polarity of the data drive signal of the second-column pixel corresponding to the 2nth row of scanning line;
    wherein the second-column pixel corresponding to the 2nth row of scanning line is charged when the 2nth row of scanning line is turned on; and within a turned-on time period of the 2nth row of scanning line, a (2n+4)th row of scanning line is turned on, and the second-column pixel corresponding to the (2n+4)th row of scanning line is pre-charged;
    wherein the number n is a nature number no less than 1.

2. A driving method for a display panel, comprising:
    charging a first-column pixel corresponding to a (2n−1)th row of scanning line and a mth column of data line with a data drive signal of a first polarity, when a (2n−1)th row of scanning line receives a gate start signal; and
    charging a second-column pixel corresponding to a 2nth row of scanning line and the mth column of data line with a data drive signal of a second polarity, when the 2nth row of scanning line receives a gate start signal, and turning on a (2n+4)th row of scanning line to pre-charge the second-column pixel corresponding to the (2n+4)th row of scanning line, wherein the first-column pixel corresponding to the (2n−1)th row of scanning line and the second-column pixel corresponding to the 2nth row of scanning line are disposed in the same row and adjacent to each other and are connected to the same mth column of data line, and wherein the first-column pixel corresponding to the (2n−1)th row of scanning line is disposed in front of the second-column pixel corresponding to the 2nth row of scanning line;
    wherein m and n are natural numbers no less than 1.

3. The driving method according to claim 2, wherein the step for charging a first-column pixel corresponding to a (2n−1)th row of scanning line and a mth column of data line with a data drive signal of a first polarity, when a (2n−1)th of scanning line receives a gate start signal further comprises:
    turning on a (2n+3)th row of scanning line and pre-charging the first-column pixel corresponding to the (2n+3)th row of scanning line within a turned-on time period of a first row of scanning line corresponding to the (2n−1)th row of scanning line;
    wherein a pre-charge time of the first-column pixel is no more than a pre-charge time of the second-column pixel.

4. The driving method according to claim 3, wherein a pre-charge time for pre-charging the second-column pixel of each row is less than a turned-on time of one row of scanning line.

5. The driving method according to claim 3, wherein a pre-charge time for pre-charging the second-column pixel of each row is equal to a turned-on time of one row of scanning line.

6. The driving method according to claim 3, wherein when the second-column pixel of each row is pre-charged, the first-column pixel of each row is pre-charged for a same time period.

7. The driving method according to claim 4, wherein when the second-column pixel of each row is pre-charged, the first-column pixel of each row is pre-charged for a same time period.

8. The driving method according to claim 5, wherein when the second-column pixel of each row is pre-charged, the first-column pixel of each row is pre-charged for a same time period.

9. The driving method according to claim 3, wherein when the second-column pixel of each row is pre-charged, the first-column pixel of each row is pre-charged;
wherein a pre-charge time for pre-charging the second-column pixel of each row is more than a pre-charge time for pre-charging the first-column pixel of each row.

10. The driving method according to claim 4, wherein when the second-column pixel of each row is pre-charged, the first-column pixel of each row is pre-charged;
wherein a pre-charge time for pre-charging the second-column pixel of each row is greater than a pre-charge time for pre-charging the first-column pixel of each row.

11. The driving method according to claim 2, wherein when the second-column pixel of each row is pre-charged, the first-column pixel of each row is not pre-charged.

12. The driving method according to claim 3, wherein a ratio of the pre-charge time to a turned-on time of one row of scanning line is equal to a predetermined ratio value.

13. A display device, implementing a display panel driving method, wherein the display panel driving method comprises steps of:
charging a first-column pixel corresponding to a (2n−1)th row of scanning line and a mth column of data line with a data drive signal of a first polarity, when a (2n−1)th row of scanning line receives a gate start signal; and
charging a second-column pixel corresponding to a 2nth row of scanning line and the mth column of data line with a data drive signal of a second polarity, when the 2nth row of scanning line receives a gate start signal, and turning on a (2n+4)th row of scanning line to pre-charge the second-column pixel corresponding to the (2n+4)th row of scanning line, wherein the first-column pixel corresponding to the (2n−1)th row of scanning line and the second-column pixel corresponding to the 2nth row of scanning line are disposed in the same row and adjacent to each other and are connected to the same mth column of data line, and wherein the first-column pixel corresponding to the (2n−1)th row of scanning line is disposed in front of the second-column pixel corresponding to the 2nth row of scanning line;
wherein m and n are natural numbers no less than 1.

14. The display device according to claim 13, wherein the step for charging a first-column pixel corresponding to a (2n−1)th row of scanning lines and a mth column of data line with a data drive signal of a first polarity, when a (2n−1)th row of scanning line receives a gate start signal further comprises:
turning on a (2n+3)th row of scanning line and pre-charging the first-column pixel corresponding to the (2n+3)th row of scanning line within a turned-on time period of a first row of scanning line corresponding to the (2n−1)th row of scanning line;
wherein a pre-charge time of the first-column pixel is no more than a pre-charge time of the second-column pixel.

15. The display device according to claim 14, wherein a pre-charge time for pre-charging the second-column pixel of each row is less than a turned-on time of one row of scanning line.

16. The display device according to claim 14, wherein a pre-charge time for pre-charging the second-column pixel of each row is equal to a turned-on time of one row of scanning line.

17. The display device according to claim 14, wherein when the second-column pixel of each row is pre-charged, the first-column pixel of each row is pre-charged for a same time period.

18. The display device according to claim 14, wherein when the second-column pixel of each row is pre-charged, the first-column pixel of each row is pre-charged;
wherein a pre-charge time for pre-charging the second-column pixel of each row is more than a pre-charge time for pre-charging the first-column pixel of each row.

19. The display device according to claim 14, wherein when the second-column pixel of each row is pre-charged, the first-column pixel of each row is not pre-charged.

20. The driving method for the display panel according to claim 12, wherein the predetermined ratio value comprises a half, two-thirds, one-third, one-quarter, or three-quarters.

* * * * *